Dec. 12, 1933. L. V. ARONSON Re. 19,023

CIGAR LIGHTER

Original Filed Oct. 16, 1926

Inventor
Louis V. Aronson

By Browne & Phelps
Attorneys

Reissued Dec. 12, 1933

TERM OF GRANT EXTENDED FOR SEVEN YEARS FROM JUNE 12, 1945 (PRIVATE LAW 554-78th CONG., CH. 738-2nd SESS.), APPROVED DEC. 23, 1944.

Re. 19,023

UNITED STATES PATENT OFFICE 19,023

CIGAR LIGHTER

Louis V. Aronson, Newark, N. J., assignor to Art Metal Works, Inc., a corporation of New Jersey Original application October 16, 1926, Serial No. 142,023. Renewed February 16, 1928. Original No. 1,673,727, dated June 12, 1928. Application for reissue October 11, 1933. Serial No. 693,195

17 Claims. (Cl. 67—7.1)

The invention relates to cigar pocket-lighters or the like and has as an object the provision of an exceedingly simple, efficient and convenient form of lighter having means to ignite a wick by means of a shower of sparks.

Further objects of the invention will appear from the following description when read in connection with the accompanying drawing showing an illustrative embodiment of the invention wherein.

Figure 1:
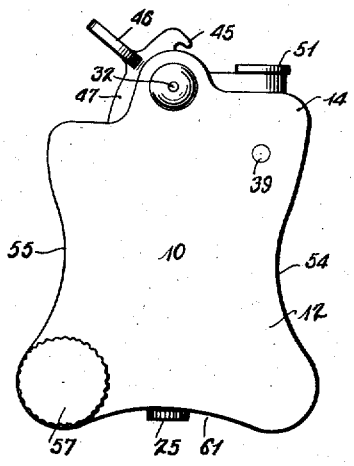
Fig. 1 is a side view.
Figure 3:
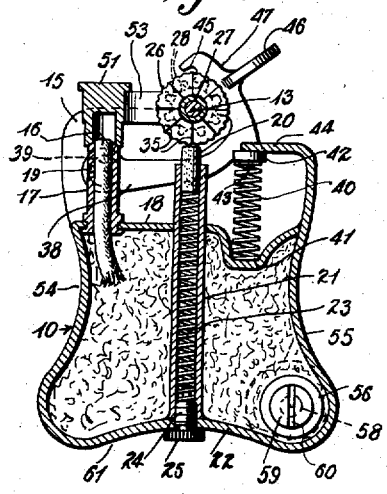
Fig. 3 is a center vertical section on line 3—3 of Fig. 2.
Figure 2:
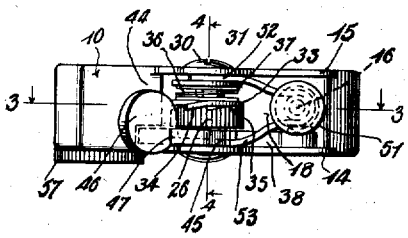
Fig. 2 is a plan view.
Figure 4:
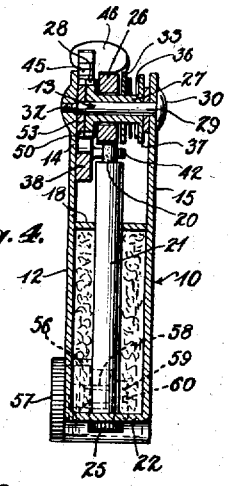
Fig. 4 is a transverse vertical section on line 4—4 of Fig. 2.

As shown the device comprises a receptacle 10 elongated in horizontal cross-section and having side walls 11, 12, projecting upwardly to support the operating shaft 13 and having wings 14, 15, spaced apart and adapted to shield the wick 16 housed in a wick tube 17 secured to the upper or top wall 18 of the receptacle 10.

As shown the wick tube 17 is provided with a perforation 19 through which a sharp implement, such as a pin, may be inserted into the wick and by means of which instrument the wick may be pried or fed upward as it is consumed in use.

As shown, the wick 16 is shown as projecting into the receptacle 10 which is desirably filled with an absorbent material such as cotton which may be saturated with an inflammable material such as benzine, alcohol, or the like, as a fuel to furnish the flame for lighting cigar, cigarette, or the like.

To produce the sparks to ignite the fuel with which the wick 16 is saturated, there is shown a pyrophoric element 20 housed in a tube 21 extending from the bottom to the top of the receptacle 10 and projecting upwardly through the receptacle 10 and through the upper wall 18 thereof, also opening through the bottom wall 22 of the receptacle.

The pyrophoric element 20 is pressed upwardly into operative engagement with the periphery of the wheel, as shown, by means of a coil spring 23 abutting against a screw-threaded plug 24 having a knurled head 25 for removal thereof from the tube 21. Sparks from the pyrophoric element 20 may be produced by means of an abradant surfaced wheel 26 journalled about a horizontal axis on top of the receptacle and mounted upon a polygonal surfaced sleeve 27 carrying pinion teeth 28 preferably formed integral therewith, the sleeve 27 being journalled on a shaft 29 having a head 30 slotted as at 31 for coaction with a screwdriver and having screw-threaded engagement at 32 with a thickened portion of the wall 12.

The wheel 26 is provided with a circular opening adapted to turn freely upon the polygonal sleeve 27 and revolution of the wheel 26 in the operating direction is adapted to be caused by means of a washer 33, having a squared portion so as to be revolved by means of sleeve 27.

To allow the washer 33 to return to normal position without causing revolution of the wheel 26, a pawl projection 34 is shown struck from one side of the washer coacting with ratchet teeth 35 formed upon one side of wheel 26 and pressed laterally into contact with the ratchet teeth by means of a compression spring 36 abutting against a washer 37 mounted upon the squared portion of sleeve 27.

Figure 5:
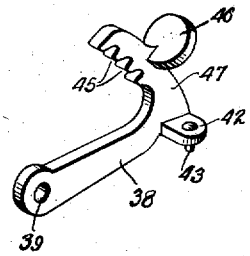
Fig. 5 is a perspective view of the operating lever.

To cause movement of the pinion teeth 28, there is shown an operating lever 38, shown in perspective in Fig. 5, which lever is adapted to be pushed by the hand of the operator or manually operated and is pivoted at 39 to the wall 12. To spring press the operating lever 38 to normal position, there is shown a compression spring 40 seated in a depression 41 in the wall 18 of the receptacle and bearing against a lug 42 carried upon the lever 38. A pin 43 is desirably mounted in the lug 42 and projects into the spring 40 to prevent displacement of the spring. Upward movement of lever 38 is stopped by a portion 44 of the edge of the device projecting over the depression 41 and between the side walls 11, 12.

Lever 38 which is pivoted on the receptacle on the opposite side of the wheel from the finger piece 46, is shown as provided with rack teeth 45 adapted to coact with the pinion or gear teeth 28 of sleeve 27 to cause revolution of the sleeve in both directions of the movement of lever 38. A finger piece 46 is shown carried by the rack teeth bearing portion 47 of the lever by which the lever may be depressed by the user. Thus the abradant wheel 26 is located centrally over the top of the receptacle and the wick projects upwardly from the top of the receptacle on one side of the wheel, while the finger piece 46 is located over the top of the receptacle on the other side of the wheel and is adapted to be pressed downwardly by the hand of the operator to operate the wheel.

Figure 6:
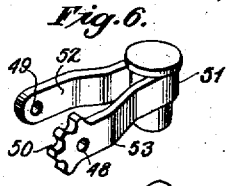
Fig. 6 is a perspective view of the snuffer carrying member.

To provide a snuffer, the member shown in perspective in Fig. 6 is provided loosely journalled at 48, 49, upon the screw 29 and therefore on the same axis as the abradant wheel, and having rack or gear teeth 50 projecting beside the pinion or gear teeth 28 and meshing with the rack teeth 45, the snuffer portion 51 being carried by the member upon the portions 52, 53, thereof.

With the described mechanism, downward manual pressure upon the thumb piece 46 will cause elevation of the snuffer and friction of the abradant surfaced wheel 26 upon the pyrophoric element 20 by manual force so as to cause sparks to be directed against wick 16 to cause ignition of the fuel thereof, the flame being shielded by wings 14, 15.

As shown in Fig. 1, the receptacle is provided at each edge with depressions 54, 55, which may be grasped by the fingers of the user while a thumb or a finger may be applied to the thumb piece 46 for actuation.

To permit renewal of the fuel in receptacle 10, there is shown an opening adjacent the bottom of the receptacle, which opening is normally closed by a screw plug 56 having a flattened head 57 preferably knurled at its edges for removal. The inner end of plug 56 is desirably formed with a bore 58 in which a refill of pyrophoric element may be carried and retained within the plug by means of a screw cap 59 having screw-threaded engagement with the inner end of plug 56, the closure at 59 being desirably slotted at 60 for coaction with a screwdriver.

The bottom of receptacle 10 is shown as upwardly curved at 61 to avoid objectionable projection of the knurled head 25. The force of spring 40 lifting the lever 38 will at the same time act on rack teeth 50 to press the snuffer 51 to position over the wick 16.

Many changes may be made in the physical embodiment of the invention within the scope of the appended claims without departing from their spirit.

I claim:

1. A cigar lighter comprising, in combination, a receptacle, a wick tube carrying a wick projecting from said receptacle, a bearing shaft carried by said receptacle, a noncylindrical surfaced sleeve journalled on said shaft, a pinion secured to said sleeve, a snuffer for said wick, spaced arms carrying said snuffer journalled on said shaft, teeth carried by one of said arms registering with teeth of said pinion, an operating lever pivotally mounted on the receptacle having teeth meshing with said pinion, an abradant surfaced wheel journalled on said sleeve, a pyrophoric element resiliently pressed against said wheel, and means whereby revolution of said sleeve in one direction will cause sparks to be thrown from said element for ignition of fuel carried by said wick.

2. A lighter having in combination a fuel receptacle, a wick projecting from the top of said receptacle and extending into the fuel in the receptacle, an abradant wheel journalled on top of said receptacle, a pyrophoric member cooperating with said wheel, a snuffer member for said wick, said snuffer member being journalled about the same axis as said wheel, a gear member also journalled on the same axis as said wheel, ratchet teeth carried by said wheel, a pawl member operated by said gear member and a manually operated rack for operating said gear member and snuffer.

3. A lighter having in combination a receptacle, a wick projecting from the receptacle, an abradant wheel journalled on said receptacle, a pyrophoric member cooperating with said wheel, a snuffer for said wick, said snuffer being journalled on the same axis as said wheel, a gear member operating the snuffer, a rack member for operating the gear member, and pawl and ratchet members for operating the wheel.

4. A lighter having in combination a receptacle, a wick projecting therefrom, an abradant wheel journalled on the receptacle, a pyrophoric member cooperating with said wheel, a snuffer for said wick, a gear member operating to raise the snuffer, a manually operated rack member for operating the gear member and pawl and ratchet members for operating the wheel, said pawl and ratchet members being operated by operation of the rack member.

5. A lighter having in combination a receptacle, an abradant wheel journalled on said receptacle, a pyrophoric member, means projecting said pyrophoric member into engagement with said wheel, a wick projecting from said receptacle on one side of said wheel, a snuffer for said wick, a finger piece mounted independently of the snuffer, and means whereby, upon pressing said finger piece, said wheel is rotated by manual pressure to ignite the wick, and said snuffer is removed from said wick, said last mentioned means including gear means operated by the finger piece and acting to operate both the snuffer and the wheel.

6. A lighter having in combination a receptacle, an abradant wheel journalled on top of the receptacle, a pyrophoric member, means including a spring projecting said pyrophoric member into engagement with said wheel, a wick extending into said receptacle and projecting from the top thereof on one side of the wheel, a finger piece located on the other side of said wheel, said finger piece being adapted to be pressed downwardly, a spring tending to force said finger piece upwardly, a stop limiting the upward movement of said finger piece, a snuffer for said wick, and means whereby upon pressing said finger piece downwardly said wheel is rotated by manual pressure to ignite the wick and said snuffer is removed from the wick, said last mentioned means comprising a rack on the finger piece and a gear operated thereby.

7. A lighter having in combination a receptacle, an abradant wheel journalled on top of the receptacle, a pyrophoric member, means including a spring projecting said pyrophoric member into engagement with said wheel, a wick extending into said receptacle and projecting from the top thereof on one side of the wheel, a finger piece located on the other side of said wheel, said finger piece being adapted to be pressed downwardly, a spring tending to force said finger piece upwardly, a snuffer for said wick, and means whereby upon pressing said finger piece downwardly said wheel is rotated by manual pressure to ignite the wick and said snuffer is removed from the wick, said last mentioned means comprising a rack on the finger piece and a gear operated thereby, and pawl and ratchet means whereby the wheel is operated by the gear.

8. A lighter having in combination a receptacle an abradant wheel journalled on top of the receptacle, a pyrophoric member, means including a spring projecting said pyrophoric member into engagement with said wheel, a wick extending into said receptacle and projecting from the top thereof on one side of the wheel, a finger piece located on the other side of said wheel, said finger piece being adapted to be pressed downwardly, a spring tending to force said finger piece upwardly, a snuffer for said wick, and means whereby upon pressing said finger piece downwardly said wheel is rotated by manual pressure to ignite the wick and said snuffer is removed from the wick, said last mentioned means comprising a rack on the finger piece and a gear operated thereby, said rack member being pivoted on the receptacle on the opposite side of the wheel from the finger piece.

9. A lighter having in combination a receptacle, an abradant wheel journalled on top of the receptacle, a pyrophoric member, a tube extending through the top of said receptacle, means including a spring projecting said pyrophoric member from the top of said tube into engagement with said wheel, a wick extending into said receptacle and projecting from the top thereof on one side of the wheel, a finger piece located on the other side of said wheel, said finger piece being adapted to be pressed downwardly, a spring tending to force said finger piece upwardly, a stop limiting the upward movement of said finger piece, a snuffer for said wick, and means whereby upon pressing said finger piece downwardly said wheel is rotated by manual pressure to ignite the wick and said snuffer is removed from the wick, said last mentioned means comprising a rack on the finger piece and a gear operated thereby, said rack member being pivoted on the receptacle on the opposite side of the wheel from the finger piece, and said snuffer being journalled on the same axis as the wheel, and pawl and ratchet means whereby the wheel is operated by the gear.

10. A pocket lighter having in combination a receptacle, an abradant wheel journalled about a horizontal axis over the top of said receptacle, a pyrophoric member, means retaining said pyrophoric member in contact with said wheel, a wick projecting from said receptacle on one side of said wheel, a finger piece, said finger piece being pivoted on an axis spaced from the axis of the wheel and also being adapted to be pressed downwardly and means whereby the movement of said finger piece is transmitted to said wheel whereby the wheel is operated by manual pressure to ignite the wick.

11. A pocket lighter having in combination a receptacle, an abradant wheel journalled over the top of the receptacle, a pyrophoric member, means retaining the pyrophoric member in contact with the wheel, a wick projecting from the top of the receptacle at one side of the wheel, a finger piece located over the top of the receptacle, said finger piece being pivoted on an axis spaced from the axis of the wheel and also being adapted to be pressed downwardly, a spring tending to force said finger piece upwardly, and means limiting the upward movement of said finger piece, and means whereby the movement of said finger piece is transmitted to said wheel whereby the wheel is operated by manual pressure to ignite the wick.

12. A lighter having in combination a receptacle, an abradant wheel journalled over the top of the receptacle, a pyrophoric member, means retaining the pyrophoric member in contact with the wheel, a wick projecting from the top of the receptacle at one side of the wheel, a finger piece located over the top of the receptacle, said finger piece being pivoted on an axis spaced from the axis of the wheel and also being adapted to be pressed downwardly, a spring tending to force said finger piece upwardly, and means whereby the movement of said finger piece is transmitted to said wheel whereby the wheel is operated by manual pressure to ignite the wick, a snuffer for the wick, said snuffer being journalled on the same axis as the wheel and operated by the finger piece.

13. A lighter having in combination a receptacle, said receptacle being elongated in horizontal cross-section, an abradant wheel centrally disposed over the top of said receptacle and journalled about a horizontal axis, a wick projecting from the top of the receptacle on one side of the wheel, a snuffer for the wick, a finger piece on the opposite side of the wheel from the wick, said finger piece being mounted independently of the snuffer, and means whereby operation of said finger piece will operate the wheel and snuffer by manual pressure, said last mentioned means including gear means operated by the finger piece and acting to operate both the snuffer and the wheel.

14. A lighter having in combination a receptacle, an abradant wheel journaled on top of said receptacle, a pyrophoric member, means projecting said pyrophoric member upwardly from the top of said receptacle into engagement with said wheel, a wick extending into said receptacle and projecting from the top thereof on one side of the wheel, a finger piece carried on top of the receptacle and adapted to be pressed downwardly, a spring tending to force said finger piece upwardly, a snuffer for said wick, and means whereby upon pressing said finger piece downwardly said wheel is rotated by manual pressure to ignite the wick and said snuffer is removed from the wick, said last mentioned means comprising a rack on the finger piece and a gear member operated thereby.

15. A lighter having in combination a receptacle, an abradant wheel journalled thereon, a pyrophoric member, means projecting said pyrophoric member into engagement with said wheel, a wick projecting from the receptacle adjacent the wheel, a snuffer for the wick, said snuffer being pivoted on the same axis as the wheel, a finger piece mounted independently of the snuffer and means whereby operation of the finger piece will operate the wheel and snuffer by manual pressure.

16. A pocket lighter having in combination a receptacle, an abradant wheel journalled about a horizontal axis over the top of said receptacle, a pyrophoric member, means retaining said pyrophoric member in contact with said wheel, a wick projecting from said receptacle on one side of said wheel, a finger piece located over the top of the receptacle on the other side of the wheel from the wick, said finger piece being pivoted on an axis spaced from the axis of the wheel and also being adapted to be pressed downwardly, and means whereby the movement of said finger piece is transmitted to said wheel whereby the wheel is operated by manual pressure to ignite the wick, a snuffer also located over the receptacle in position to enclose the projecting portion of the wick, said snuffer being raised from the wick by downward movement of the finger piece, to expose the wick to ignition.

17. A pocket lighter having in combination a receptacle, an abradant wheel journalled about a horizontal axis over the top of said receptacle, a pyrophoric member, means retaining said pyrophoric member in contact with said wheel, a wick projecting from said receptacle on one side of said wheel, a finger piece located over the top of the receptacle on the other side of the wheel from the wick, said finger piece being pivoted on an axis spaced from the axis of the wheel and also being adapted to be pressed downwardly, a spring tending to force said finger piece upwardly and means whereby the movement of said finger piece is transmitted to said wheel whereby the wheel is operated by manual pressure to ignite the wick, a snuffer also located over the receptacle in position to enclose the projecting portion of the wick, said snuffer being raised from the wick by downward movement of the finger piece, to expose the wick to ignition.

LOUIS V. ARONSON.